United States Patent
Lim

(10) Patent No.: US 8,405,352 B2
(45) Date of Patent: Mar. 26, 2013

(54) BATTERY MANAGEMENT SYSTEM AND BATTERY MANAGEMENT METHOD

(75) Inventor: Gye-Jong Lim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 187 days.

(21) Appl. No.: 12/627,266

(22) Filed: Nov. 30, 2009

(65) Prior Publication Data

US 2010/0134068 A1 Jun. 3, 2010

(30) Foreign Application Priority Data

Dec. 1, 2008 (KR) .................. 10-2008-0120667

(51) Int. Cl.
*H02J 7/00* (2006.01)
(52) U.S. Cl. ........ 320/122; 320/116; 320/118; 320/119; 320/132
(58) Field of Classification Search .............. 320/116, 320/122
See application file for complete search history.

(56) References Cited

U.S. PATENT DOCUMENTS

| 7,638,973 | B2 | 12/2009 | Lee et al. | |
|---|---|---|---|---|
| 2004/0155629 | A1 | 8/2004 | Kobayashi et al. | |
| 2008/0100268 | A1 | 5/2008 | Lim et al. | |
| 2008/0169789 | A1* | 7/2008 | Yamabe | 320/136 |
| 2008/0211459 | A1* | 9/2008 | Choi | 320/134 |
| 2009/0096420 | A1* | 4/2009 | Lupu et al. | 320/122 |

FOREIGN PATENT DOCUMENTS

| EP | 1 912 307 A2 | 4/2008 |
|---|---|---|
| EP | 1 919 059 A2 | 5/2008 |
| JP | 2000-092733 | 3/2000 |
| JP | 2002-374633 | 12/2002 |
| JP | 2003-274568 | 9/2003 |
| JP | 2007-318950 | 12/2007 |
| JP | 2008-118841 A | 5/2008 |
| JP | 2008-522580 | 6/2008 |
| JP | 2008-178186 | 7/2008 |
| KR | 10-2001-0039836 | 5/2001 |
| KR | 10-2006-0109048 | 10/2006 |
| KR | 10-2007-0119044 | 12/2007 |
| KR | 10-2008-0013136 | 2/2008 |
| KR | 10-0839381 | 6/2008 |
| KR | 10-2008-0080864 | 9/2008 |
| WO | WO 2006/068430 A1 | 6/2006 |

OTHER PUBLICATIONS

Japanese Office action dated Dec. 14, 2010, for corresponding Japanese Patent application 2009-009183.
Patent Abstracts of Japan and English machine translation of Japanese Publication 2002-374633, 21 pages.
European Search Report dated May 11, 2010, for corresponding European Patent application 09177621.1.
KIPO Office action dated Sep. 16, 2010, for priority Korean Patent application 10-2008-0120667.
Japanese Patent Office Action dated Apr. 10, 2012 for corresponding Japanese application No. JP 2009-009183 (3 pages).

(Continued)

*Primary Examiner* — Edward Tso
*Assistant Examiner* — Ahmed Omar
(74) *Attorney, Agent, or Firm* — Christie, Parker & Hale, LLP

(57) ABSTRACT

A battery management system and method, the method including balancing cells and measuring the cell voltages of cells that are not directly adjacent to the cells being balanced.

17 Claims, 4 Drawing Sheets

OTHER PUBLICATIONS

SIPO Office action dated Mar. 30, 2012, for corresponding Chinese Patent application 200910246084.6, with English translation, (20 pages).

KIPO Office action dated Dec. 1, 2011, for Korean priority Patent application 10-2008-0120667, 5 pages.

* cited by examiner

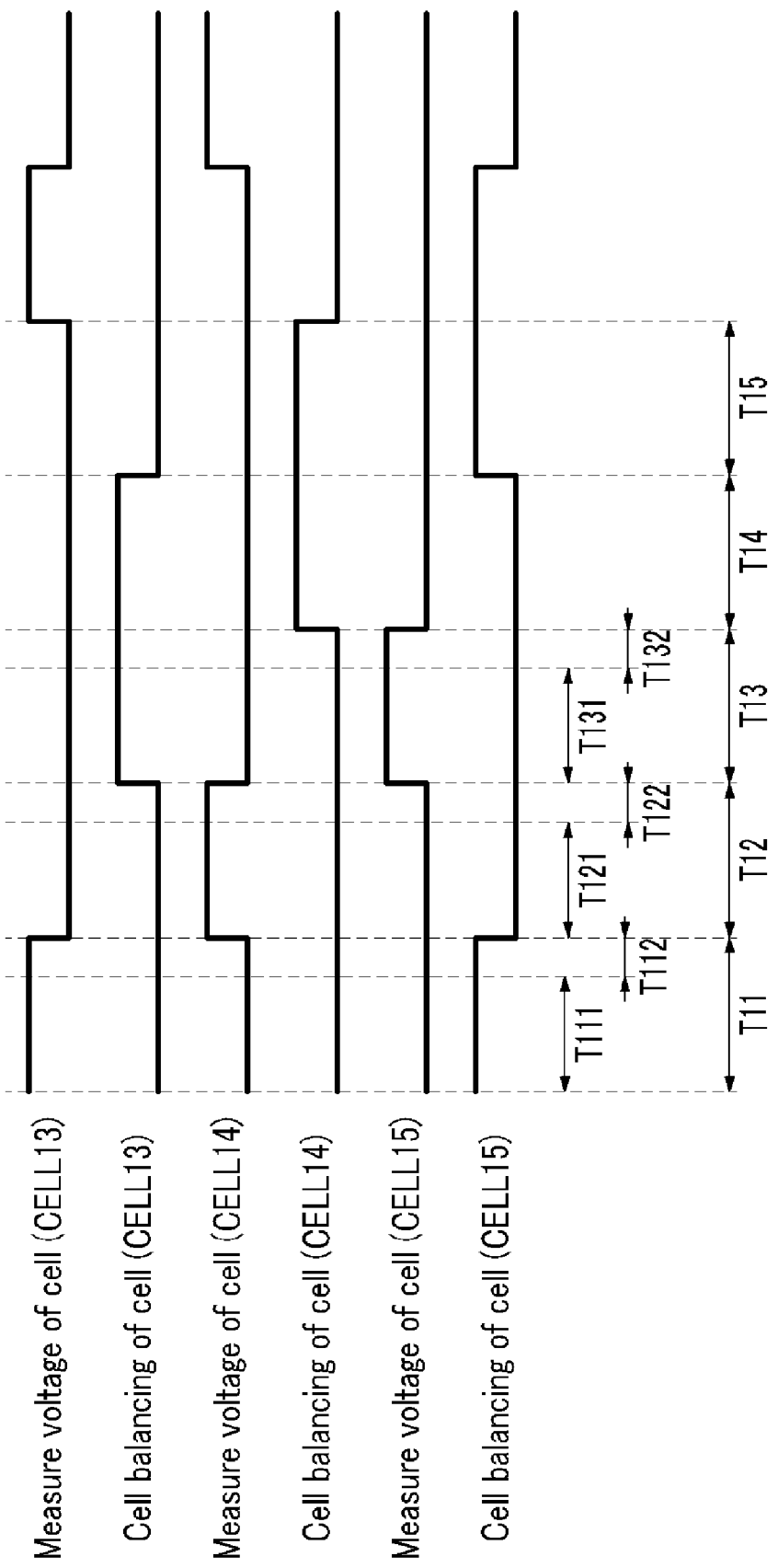

BATTERY MANAGEMENT SYSTEM AND BATTERY MANAGEMENT METHOD

CROSS-REFERENCE TO RELATED APPLICATION

This application claims the benefit of Korean Patent Application No. 10-2008-0120667, filed on Dec. 1, 2008, in the Korean Intellectual Property Office, the disclosure of which is incorporated herein, by reference.

BACKGROUND OF THE INVENTION

1. Field of the Invention

Aspects of the present invention relate to a battery management system.

2. Description of the Related Art

In general, conventional vehicles having only an internal combustion engine are considered to be one of the primary causes of environmental pollution. Accordingly, in recent years, in order to decrease environmental pollution, attempts to develop electric vehicles and hybrid vehicles have been actively undertaken.

An electric vehicle has an electric motor that is powered by a battery pack including a plurality of rechargeable secondary. Since an electric vehicle uses a battery pack as a main power source, exhaust gas is not generated and little noise is produced.

A hybrid vehicle is an intermediate stage between a conventional internal combustion engine vehicle and an electric vehicle. A hybrid vehicle uses two or more power sources, for example, an internal combustion engine and a battery-powered motor. At the present time, a hybrid vehicle that uses an internal combustion engine and a fuel cell, where electrical energy is directly generated by chemically reacting hydrogen and oxygen, and a hybrid vehicle that uses a battery pack and a fuel cell, are being developed.

The number of secondary cells in a battery pack is increasing, in order to improve the power output thereof. Therefore, a cell balancing control method that can efficiently manage a plurality of connected cells in such battery packs is needed in a battery management system (hereinafter referred to as BMS).

When a battery pack includes a plurality of cells that are connected in series, balancing the cells is important. Such balancing refers to minimizing a difference between the voltages of the cells, to within an allowable range. Hereinafter, the balancing of the cells is referred to as "cell balancing." Cell balancing is closely connected with the life-span and power output of a battery pack. A cell where the cell balancing does not occur deteriorates, shortening the life-span of the battery pack, and reducing the power output thereof.

The cell balancing is generally performed without regard to whether the cell voltages of cells are being measured. However, since the cell balancing and the cell voltage measurement are both performed through an electric line that is connected to the cells, if the cell balancing and the cell voltage measurement are simultaneously performed, they may interfere with each other. That is, when a cell voltage of a cell is checked, while the cell is being balanced, a voltage drop is generated by resistance of an electric line, resulting in a measured cell voltage that is lower than the actual cell voltage. Further, when the voltage of an adjacent cell that shares the electric line is measured, the measured voltage is higher than the actual cell voltage.

Specifically, referring to FIG. 1, a problem according to the related art will be described in detail. FIG. 1 is a diagram illustrating a waveform of a cell voltage measurement that is generated when cell balancing is performed, in a battery management system according to the related art. FIG. 1 shows a cell voltage waveform of a first cell of a plurality of cells of a battery system. Two cells that are adjacent to opposing sides of the first cell are referred to as a second cell and a third cell. The third, first, and second cells are sequentially arranged, close to a ground terminal.

As shown in FIG. 1, at a point of time T1, cell balancing of the second cell starts. Then, if a voltage of the first cell is measured, the voltage of the first cell increases, due to a current that is generated while the second cell is balanced, and due to the internal resistance of an electric line that is shared by the first cell and the second cell. At time T2, if the cell balancing of the first cell starts, the voltage of the first cell decreases, due to a voltage drop generated by the internal resistance of an electric line that is connected to the first cell. At this time, the voltage of the third cell, which shares an electric line with the first cell, increases. At time T3, if the cell balancing of the first cell is completed, the voltage of the third cell is measured as an actual voltage. At time T4, if the cell balancing of the second cell is completed, the voltage of the first cell is also measured as an actual voltage.

As such, the battery management system according to the related art has problems, in that the cell balancing and the cell voltage measurement are simultaneously performed, resulting in a measured cell voltage that is different from an actual cell voltage, due to the cell balancing of the adjacent cell.

SUMMARY OF THE INVENTION

Aspects of the present invention provide a battery management system and a battery management method, which can measure a cell voltage without being affected by a cell balancing operation.

An exemplary embodiment of the present invention provides a battery management system. The battery management system includes a plurality of cells, a cell balancing unit that performs cell balancing on each of the cells, a cell selecting unit that selects any one of the cells, and a (micro-control unit) MCU that receives a voltage corresponding to the cell selected by the cell selecting unit and controls the voltage measurement and cell balancing of the selected cell. The MCU controls the cell balancing unit, so as not to perform cell balancing on the selected cell and the cells adjacent to the selected cell, when the voltage of the selected cell is being measured. The MCU generates first control signals that control the cell balancing unit and correspond to each of the cells, and a second control signals that control the cell selecting unit and correspond to each of the cells. The MCU inactivates the first control signal that corresponds to the selected cell and the first and second control signals corresponding to the cells adjacent to the selected cell, when the second control signal corresponding to the selected cell is activated. When a voltage of the first cell is measured to exceed a normal voltage range, the first control signal is activated. The first control signal that corresponds to the selected cell is activated, when the second control signal that corresponds to the selected cell and the second control signals that correspond to the adjacent cells are inactivated. The first and second control signals are sequentially activated.

The cell selecting unit includes a plurality of selection switches that are connected to ends of the cells, and a plurality of cell balancing switches that are connected to ends of the cells. The cell balancing switch that corresponds to a selected cell is turned on, while the selection switches corresponding to the selected cell and the cells adjacent to the selected cell are turned off. The two selection switches that correspond to the selected cell selected are turned on, and the voltage of the selected cell is measured. The MCU includes a capacitor that is charged with a voltage corresponding to the selected cell, and a relay unit that is connected to the capacitor. After the voltage of the selected cell is charged in the capacitor, the MCU turns on the relay unit, receives the voltage charged in the capacitor, and measures the voltage of the selected cell.

Another exemplary embodiment of the present invention provides a battery management method that manages a battery including a plurality of cells. The battery management method includes sequentially measuring the cell voltages of the cells. When the measured cell voltage is a reference voltage, or more, cell balancing is performed to discharge the corresponding cell to the reference voltage. When cell balancing is needed in a second cell that is adjacent to a first cell, the cell balancing of the second cell is performed, after the cell voltage measurement of the first cell is completed. In this case, the cell balancing is sequentially performed, according to the order in which the cells voltage measurements are performed. If the voltage of the first cell is higher than the predetermined reference voltage, the cell balancing of the first cell starts, when the cell voltage measurement of the first cell is completed. The cell voltage measurement of the second cell is performed, after the cell voltage measurement of the first cell is completed. During the measuring of the cell voltage of the first cell, the cell balancing is performed on a third cell that is not adjacent to the first cell.

According to aspects of the present invention, cell balancing and cell voltage measuring can be performed at different times for different cells, and a cell voltage can be measured without affecting the cell balancing. It is possible to prevent a voltage difference from being generated between a measured voltage and an actual voltage of a battery.

According to aspects of the present invention, the cell voltage measurements can be sequentially performed, through the switches, and the cell balancing can be sequentially performed, in accordance with a cell voltage measurements. As a result, it is possible to perform the cell balancing without affecting the speed of the cell voltage measurement.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a waveform diagram illustrating the operation of a battery management system, according to an exemplary embodiment of the present invention.

DETAILED DESCRIPTION OF THE EXEMPLARY EMBODIMENTS

Figure 1:
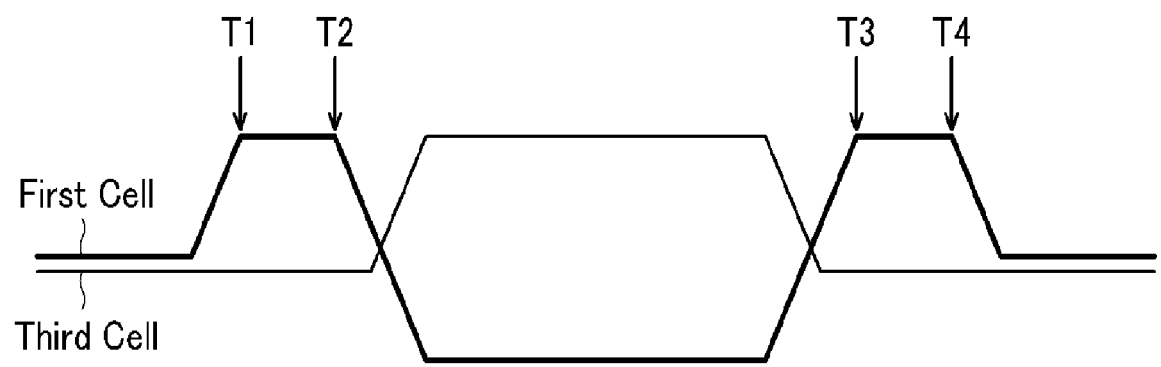
FIG. 1 is a diagram illustrating a problem of a driving method of a battery management system (BMS), according to the related art.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Throughout this specification and the claims that follow, when it is described that an element is "connected" to another element, the element may be "directly connected" to the other element, or "electrically connected" to the other element through a third element. If an element is referred to as being "directly electrically connected" to another element, other elements are not disposed on an electrical path between the directly electrically connected elements. In addition, unless explicitly described to the contrary, the word "comprise" and variations, such as "comprises" or "comprising" will be understood to imply the inclusion of stated elements, but not the exclusion of any other elements.

Figure 2:
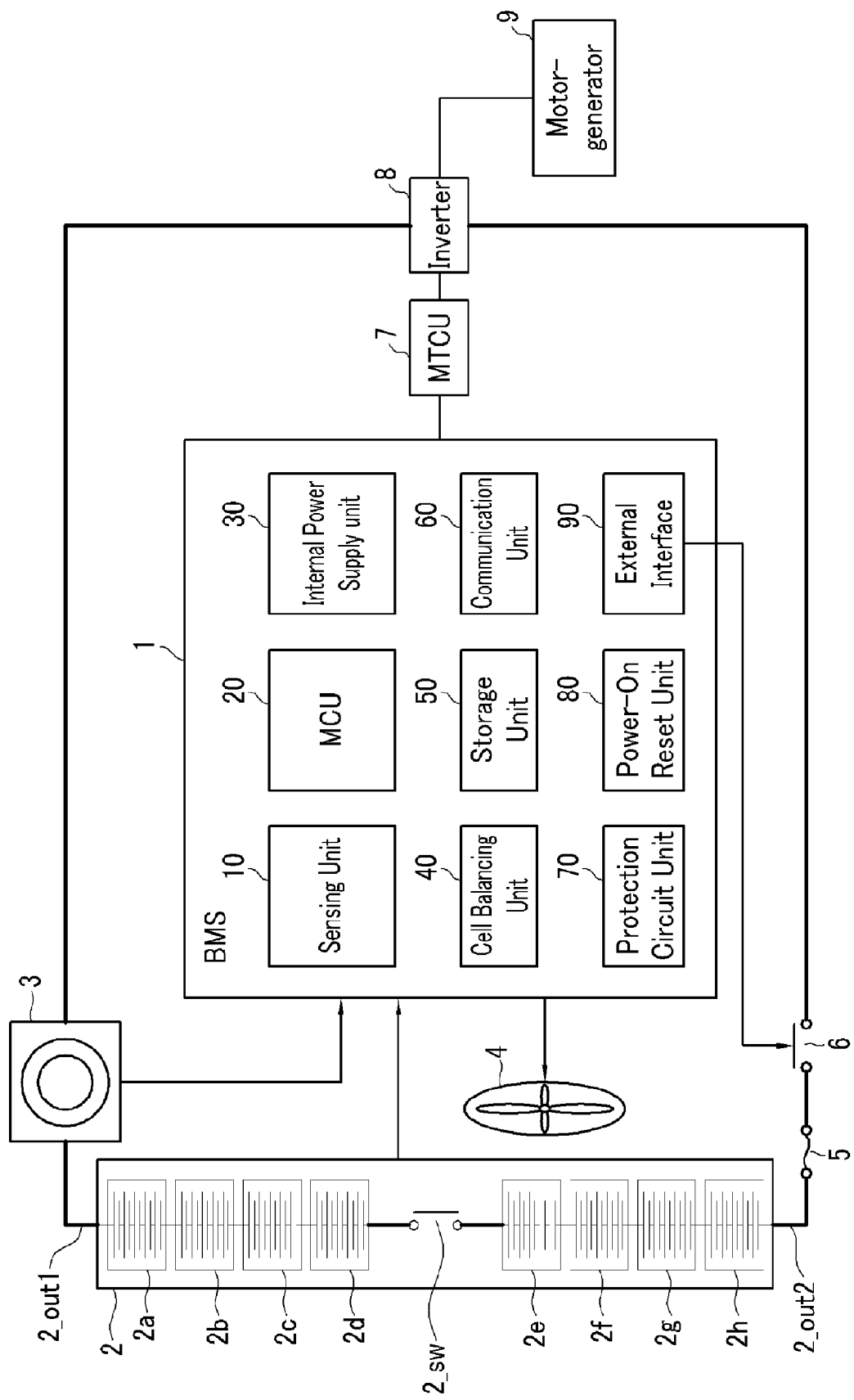
FIG. 2 is a schematic diagram illustrating a battery, a BMS, and peripheral devices of the BMS, according to an exemplary embodiment of the present invention.

FIG. 2 is a schematic diagram illustrating a vehicle system, according to an exemplary embodiment of the present invention. As shown in FIG. 2, the vehicle system includes a battery management system (BMS) 1, a battery 2, a current sensor 3, a cooling fan 4, a fuse 5, a main switch 6, a motor control unit (MTCU) 7, an inverter 8, and a motor-generator 9.

The battery 2 (battery pack) includes a plurality of sub-packs 2a to 2h, that are connected in series, an output terminal 2_OUT1, an output terminal 2_OUT2, and a safety switch 2_SW that is provided between the sub-pack 2d and the sub-pack 2e. In this case, eight sub-packs 2a to 2h are exemplified. Each of the sub-packs 2a to 2h includes a plurality of connected battery cells, but the present invention is not limited thereto. The safety switch 2_SW that is can be manually turned on/off, in order to ensure safety of a worker when the worker replaces a battery or performs work on the battery. The safety switch 2_SW is shown to be provided between the sub-pack 2d and the sub-pack 2e, but the present invention is not limited thereto. The output terminal 2_OUT1 and the output terminal 2_OUT2 are connected to the inverter 8.

The current sensor 3 measures an output current of the battery 2 and outputs the measured current to a sensing unit 10 of the BMS 1. Specifically, the current sensor 3 may be a Hall current transformer (HALL CT) that measures a current using a Hall element and outputs an analog current signal corresponding to the measured current. In the alternative, the current sensor 3 may be a shunt resistor that outputs a voltage signal with respect to an amount of current that flows through a resistor provided on a load line.

The cooling fan 4 dissipates heat that may be generated during charging and/or discharging of the battery 2, on the basis of a control signal from the BMS 1. The cooling fan 4 prevents the battery 2 from being damaged, and/or prevents a reduction in the charge and discharge efficiency of the battery 2, due to a temperature increase thereof.

The fuse 5 prevents an overcurrent from being transmitted to the battery 2, due to a break or a short circuit. That is, if an overcurrent is generated, the fuse 5 is broken, and the transmission of the overcurrent to the battery 2 is stopped.

If an abnormal phenomenon, such as an overvoltage, an overcurrent, or a high temperature is generated, the main switch 6 turns the battery 2. The main switch 6 is controlled on the basis of a control signal from the BMS 1 or the MTCU 7.

The BMS 1 includes the sensing unit 10, a micro-control unit (MCU) 20, an internal power supply unit 30, a cell balancing unit 40, a storage unit 50, a communication unit 60, a protection circuit unit 70, a power-on reset unit 80, and an external interface 90.

The sensing unit 10 measures the total current of the battery pack 2 (pack current), the total voltage of the battery pack 2 (pack voltage), the temperature of the battery pack 2, and the ambient temperature, and transmits the measured values to the MCU 20.

The MCU 20 controls voltage measurement of each cell of the battery 2 and uses the measured cell voltages to determine whether cell balancing should be performed. The MCU 20 sends a corresponding control signal to the cell balancing unit 40.

The internal power supply unit 30 generally supplies power to the BMS 1, using an auxiliary battery. The cell balancing unit 40 balances the voltage of each cell. That is, a cell having a relatively high voltage may be discharged, and a cell having a relatively low voltage can be charged. The storage unit 50 stores data, such as the state of charge (SOC) and the state of health (SOH) of the battery 2, when a power supply of the BMS 1 is turned off. In this case, the storage unit 50 may be a non-volatile storage device that can electrically write and erase data, for example an electrically erasable programmable read-only memory (EEPROM).

The communication unit 60 communicates with the MTCU 7. The communication unit 60 transmits the SOC and the SOH from the BMS 1, to the MTCU 7, or receives vehicle state information from the MTCU 7 and transmits the information to the MCU 20. The protection circuit unit 70 is a secondary circuit that additionally protects the battery 2 from overcurrents and/or overvoltages, using a hardware element. Firmware that is installed in the MCU 20 performs a primary protection operation. The power-on reset unit 80 resets the entire system, when the power supply of the BMS 1 is turned on. The external interface 90 connects auxiliary devices to the BMS 1, such as the cooling fan 4 and the main switch 6. In the present exemplary embodiment, only the cooling fan 4 and the main switch 6 are shown, but the present invention is not limited thereto.

The MTCU 7 recognizes a current operating state of the vehicle, on the basis of the vehicles acceleration, braking, and/or speed. The MTCU 7 uses such information to make determinations, such as the torque needs of the vehicle. In further detail, the current operation state of the vehicle refers to a key on state (whether the vehicle is turned on), key off state (whether the vehicle is turned off), the current velocity of the vehicle, and/or the current acceleration of the vehicle. The MTCU 7 transmits information of the vehicle operating state to the communication unit 60. The MTCU 7 controls the output of the motor-generator 9, to match torque information. That is, the MTCU 7 controls the switching of the inverter 8 and controls the output of the motor-generator 9 to match the torque information.

The MTCU 7 receives the SOC of the battery 2 from the MCU 20, through the communication unit 60, and controls the SOC of the battery 2, according to a target value (e.g., 55%). For example, when the SOC is 55%, or less, the MTCU 7 controls the inverter 8 to output power to the battery 10, so as to charge the battery 2. In this example, the MTCU 7 may set the current to the battery 2 as a positive value. When the SOC is larger than 55%, the MTCU 7 controls the inverter 8 to output power to the motor-generator 9, so as to discharge the battery 2. In this example, the MTCU 7 may set the battery current as a negative value.

The inverter 8 causes the battery 2 to be charged or discharged, on the basis of the control signal from the MTCU 7. The motor-generator 9 drives the vehicle using electrical energy from the battery 2, on the basis of the torque information transmitted from the MTCU 7.

In short, the MTCU 7 charges or discharges the battery 2, on the basis of the SOC, to prevent the battery 2 from being overcharged or overdischarged, so as to prolong the lifespan of the battery 2. However, after the battery 2 is mounted to the vehicle, it is difficult to measure the actual SOC of the battery 2. Thus, the BMS 1 accurately estimates the SOC, using the pack current, the pack voltage, and the pack temperature, which are sensed by the sensing unit 10. The BMS 1 transmits the estimated SOC to the MTCU 7.

Figure 3:
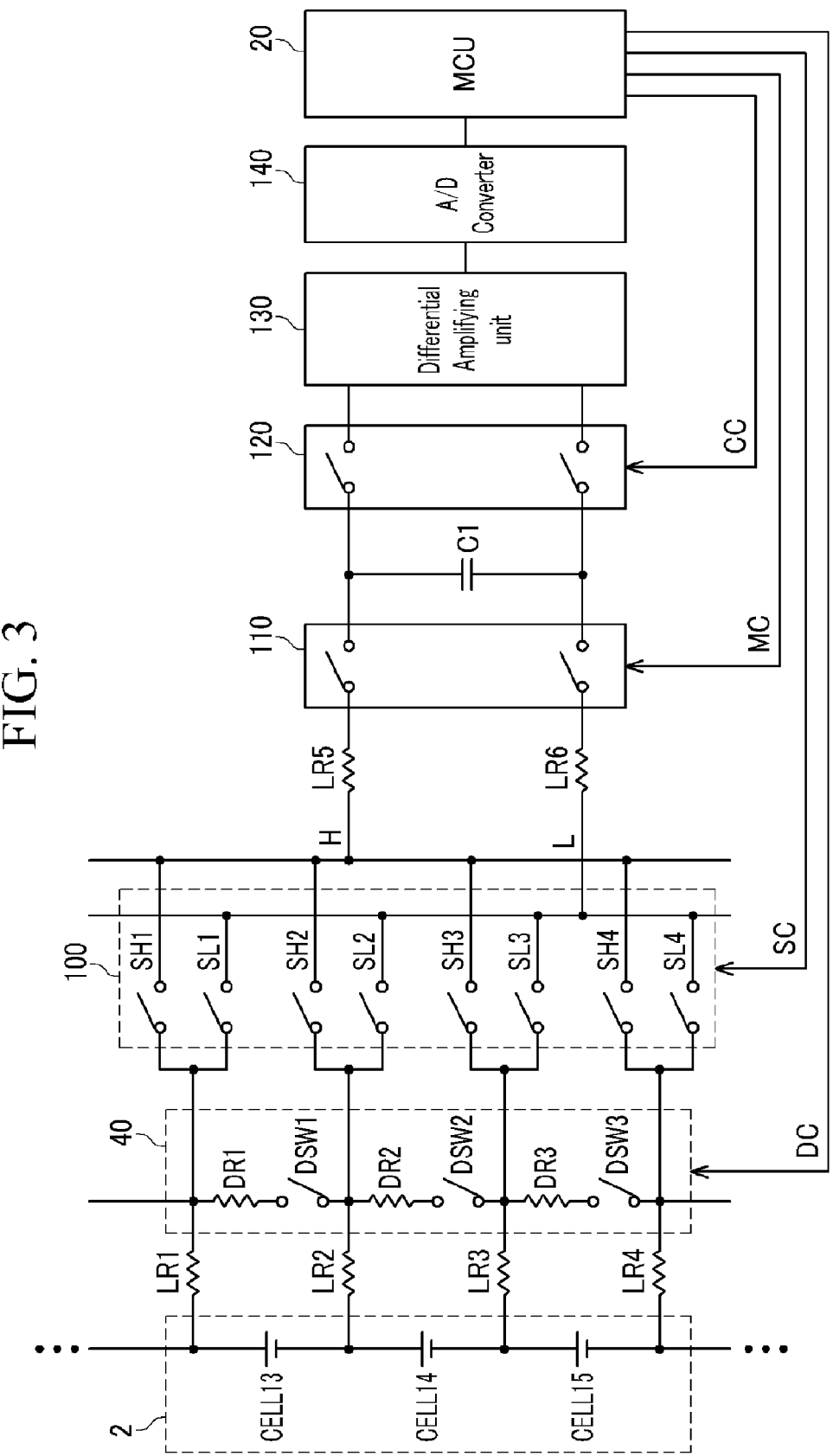
FIG. 3 is a diagram illustrating a battery management system, according to an exemplary embodiment of the present invention.

FIG. 3 is a diagram illustrating a battery management system, according to an exemplary embodiment of the present invention. Referring to FIG. 3, the battery management system includes a cell balancing unit 40, line resistors LR1 to LR6, a cell selecting unit 100, first and second relay units 110 and 120, a capacitor C1, a differential amplifying unit 130, an analog/digital (A/D) converter 140, and a microcontrol unit (MCU) 20. The battery management system is connected to a battery 2. The battery 2 includes sub-packs that include a plurality of cells. The battery management system can be used in conjunction with the vehicle system of FIG. 2. In FIG. 3, for better understanding and ease of description, only one sub-pack is shown, which includes cells CELL13 to CELL15.

The cell balancing unit 40 includes discharge resistors DR1 to DR3 and cell balancing switches DSW1 to DSW3. The discharge resistor DR1 and the cell balancing switch DSW1 are connected in series, between opposing ends of the cell CELL13. The discharge resistor DR2 and the cell balancing switch DSW2 are connected in series, to opposing ends of the cell CELL14. The discharge resistor DR3 and the cell balancing switch DSW3 are connected in series, to opposing ends of the cell CELL15. In this case, the cell balancing switches DSW1 to DSW3 are turned on/off, according to discharge control signals DC that are output from the MCU 20. The discharge control signals DC can be a plurality of signals that each correspond to one of the cell balancing switches DSW1 to DSW3. For example, among the cells CELL13 to CELL15, when the cell CELL13 is balanced, one of the discharge control signals DC turns on the cell balancing switch DSW1. The cell CELL13 is then discharged through the discharge resistor DR1.

The line resistor LR1 is an internal resistor of an electric line that connects one end of the cell CELL13 to the discharge resistor DR1. The line resistor LR2 is an internal resistor of an electric line that connects the other end of the cell CELL13 to the cell balancing switch DSW1. The line resistor LR3 is an internal resistor of an electric line that connects the other end of the cell CELL14 to the discharge resistor DR3. The line resistor LR4 is an internal resistor of an electric line that connects the other end of the cell CELL15 to the cell balancing switch DSW3. The line resistor LR5 is an internal resistor of an electric line that connects the first output terminal H to the first relay unit 110. The line resistor LR6 is an internal resistor of an electric line that connects the second output terminal L to the first relay unit 110.

The cell selecting unit 100 includes a plurality of cell selection switches SH1 to SH4 and SL1 to SL4. The cell selection switches SH1 to SH4 and SL1 to SL4 are turned on/off, according to selection control signals SC that are output from the MCU 20. One end of the cell selection switch SH1 is electrically connected to one end of the cell CELL13, and the other end of the cell selection switch SH1 is electrically connected to the first output terminal H. One end of the cell selection switch SL1 is electrically connected to the other end of the cell CELL13, and the other end of the cell selection switch SL1 is electrically connected to the second output terminal L. In a similar fashion, each of the cell selection switches SH1 to SH4 is electrically connected to one end of a corresponding cell and to the first output terminal H. Each of the cell selection switches SL1 to SL4 is electrically connected to one end of a corresponding cell and to the second output terminal L. The selection control signals SC can be a plurality of signals that each correspond to one of the cell selection switches SH1 to SH4 and SL1 to SL4. For example, when the cell CELL13 is selected, the selection control signals SC turn on the cell selection switches SH1 and SL2. As a result, the first output terminal H and the second output terminal L are connected to opposing ends of the cell CELL13.

The first relay unit 110 transmits voltages that are stored in the cells CELL13 to CELL15, to the capacitor C1, in accordance with measurement control signals MC output from the MCU 20. The second relay unit 120 transmits a voltage that is stored in the capacitor C1 to the differential amplifying unit 130, in accordance with connection control signals CC output from the MCU 20.

The capacitor C1 is connected between the first output terminal H and the second output terminal L. The differential amplifying unit 130 amplifies the voltage transmitted from the capacitor C1 to generate an output voltage, according to a gain corresponding to a resistance ratio of at least one resistor. The generated output voltage is transmitted to the A/D converter 140.

The A/D converter 140 converts the output voltage into a digital output signal. The digital output signal is transmitted to the MCU 20.

The MCU 20 determines whether the cells CELL13 to CELL15 are balanced, according to the digital output signal. The MCU 20 generates the discharge control signals DC, to control a cell balancing operation, i.e., to control which of the cells CELL13 to CELL15 are balanced, and in what order they are balanced. In addition, the MCU 20 generates the selection control signals SC that select which of the cells CELL13 to CELL15 are to have their voltages measured. The MCU 20 also generates the measurement control signals MC and the connection control signals CC that control the first and second relays 110 and 120. In this case, the discharge control signals DC and the selection control signals SC are sequentially activated and correspond to the cells CELL13 to CELL 15.

FIG. 4 is a waveform diagram illustrating the operation of a battery management system, according to an exemplary embodiment of the present invention. Referring to FIG. 4, during a period T111, the MCU 20 outputs the selection control signals SC and the measurement control signals MC. As a result, the cell selection switches SH1 and SL2, and the first relay unit 110 are turned on, and a voltage corresponding to the voltage of the cell CELL13 is stored in the capacitor C1. During a period T112, the MCU 20 turns off the cell selection switches SH1 and SL2, and the first relay unit 110, and then turns on the second relay unit 120. As a result, the voltage that is stored in the capacitor C1 is transmitted to the differential amplifying unit 130. At this time, the cell balancing switches DSW1 and DSW2, and the cell selection switches SH2, SH3, SH4, SL1, SL3, and SL4 maintain a turned-off state. Then, a voltage is transmitted from the differential amplifying unit 130 to the MCU 20, through the A/D converter 140. Then, the MCU 20 determines whether the voltage of the cell CELL13 is within a normal voltage range.

That is, during the period T11, the MCU 20 measures the voltage of only the cell CELL13, and performs a control operation, to prevent the cell CELL13 from being balanced and the voltage of the adjacent cell CELL14 from being measured, while the voltage of the cell CELL13 is being measured. However, during the period T11, the cell 15 can be balanced, while accurately measuring the actual voltage of the cell CELL13.

Since the cell CELL15 does not share an electric line with the cell CELL13 and does not affect the cell CELL13, the cell balancing operation of the cell CELL15 can be performed, while the voltage of the cell CELL13 is measured. FIG. 4 exemplifies the case where the cell balancing operation of the cell CELL15 is performed, during the period T11. At this time, the cell balancing switch DSW3 is in a turned-on state.

During a period T121, the MCU 20 turns on the cell selection switches SH2 and SL3, and the first relay unit 110. As a result, a voltage that corresponds to the voltage of the cell CELL14 is charged in the capacitor C1. Then, during a period T122, the MCU 20 turns off the cell selection switches SH2 and SL3, and the first relay unit 110, and turns on the second relay unit 120 to transmit the voltage charged in the capacitor C1 to the differential amplifying unit 130. At this time, the cell balancing switches DSW1 and DSW2, and the cell selection switches SH1, SH3, SH4 SL1, SL2, and SL4 maintain a turned-off state. Then, the voltage that is transmitted to the differential amplifying unit 130 is transmitted to the MCU 20, through the A/D converter 140. Then, the MCU 20 determines whether the voltage of the cell CELL14 is within a normal voltage range. That is, during the period T121, the MCU 20 measures the voltage of the cell CELL14 and performs a control operation, such that the cells 13 and 15 are not voltage-measured or balanced.

During a period T131, the MCU 20 turns on the cell selection switches SH3 and SL4, and the first relay unit 110. At this time, the cell balancing switches DSW2 and DSW3, and the cell selection switches SH1, SH2, SH4, SL1, SL2, and SL3 maintain a turned-off state. As a result, the voltage that is stored in the cell CELL15 is charged in the capacitor C1. Then, during a period T132, the MCU 20 turns off the cell selection switches SH3 and SL4, and the first relay unit 110, and turns on the second relay unit 120 to transmit the voltage charged in the capacitor C1 to the differential amplifying unit 130. Then, the voltage that is transmitted to the differential amplifying unit 130 is transmitted to the MCU 20, through the A/D converter 140. Then, the MCU 20 determines whether the voltage of the cell CELL15 is within a normal voltage range. That is, according to the exemplary embodiment of the present invention, the voltages of the cells CELL13 to CELL15 are measured sequentially, from CELL13 to CELL15.

During the period T13, the MCU 20 outputs the discharge control signals DC, when the voltage of the cell CELL13, as measured during the period T11, exceeds the normal voltage range. As a result, the cell balancing switch DSW1 is turned on, and the voltage of the cell CELL13 is discharged through the discharge resistor DR1. That is, while the voltage of the cell CELL15 is measured, the cell balancing of the cell CELL13, which is not adjacent to the cell CELL15, can be performed without affecting the accuracy of the voltage measurement of the cell CELL15.

During the period T14, the MCU 20 turns off the cell selection switches SH3 and SL3. At this time, according to the measured voltage of the cell CELL14, the MCU 20 selectively turns on the cell balancing switch DSW2. That is, when the voltage measurement of the cell CELL15 is completed, the cell balancing of the cell CELL14, which is adjacent to the cell CELL15, is performed. Accordingly, the voltage of the cell CELL15 can be measured, without being affected by the cell balancing of the cell CELL14.

During a period T15, the MCU 20 selectively turns on the cell balancing switch DSW3, in accordance with the measured voltage of the cell CELL15. The operations of the periods T11 to T15 can be repetitively performed.

That is, according to the exemplary embodiment of the present invention, the voltage measurement operation on each cell is sequentially performed. Cell balancing is not performed on a cell that is being voltage-measured, and cells adjacent to the voltage-measured cell are not balanced. Accordingly, since a voltage drop, due to the cell balancing, does not affect voltage measurement, the voltage measurement can be accurately performed. In addition, the cell balancing operation is also sequentially performed on the cells, in consideration of the voltage measuring operation, and the cell balancing can be performed, without reducing the accuracy of the voltage measurement.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A battery management system, comprising:
   cells having cell voltages;
   a cell balancing unit that balances the cell voltages;
   a cell selecting unit that establishes an electrical connection to a selected cell, the selected cell being one of the cells that is not being balanced; and
   a micro-control unit (MCU) that
      measures the cell voltages of the cells,
      controls operations of the cell balancing unit and the cell selecting unit, and
      prevents the selected cell that is not being balanced, and the cells directly electrically connected to the selected cell, from being balanced while the cell voltage of the selected cell is being measured.

2. The battery management system of claim 1, wherein the MCU:
   selectively activates/inactivates first control signals that control the cell balancing unit, each of the first control signals corresponding to a particular one of the cells;
   selectively activates/inactivates second control signals that control the cell selecting unit, each of the second control signals corresponding to a particular one of the cells; and
   inactivates the first control signals that correspond to the selected cell and the first and second control signals corresponding to the cells that are directly electrically connected to the selected cell, when the second control signal that corresponds to the selected cell is activated.

3. The battery management system of claim 2, wherein when the cell voltage of the selected cell is measured to exceed a normal voltage range, the first control signal that corresponds to the selected cell is activated, such that the cell balancing unit balances the selected cell.

4. The battery management system of claim 3, wherein when the selected cell is balanced, the second control signals that correspond to the cells that are directly connected to the selected cell are inactivated.

5. The battery management system of claim 2, wherein the first and second control signals are sequentially activated, such that all of the cell voltages are measured and the cells that are unbalanced are balanced, sequentially.

6. The battery management system of claim 1, wherein:
   the cell selecting unit comprises selection switches that establish the electrical connection to the cells; and
   the cell balancing unit comprises cell balancing switches that connect the cells to balancing circuits.

7. The battery management system of claim 6, further comprising lines that connect pairs of the selection switches to each of the cells.

8. The battery management system of claim 1, further comprising:
   a capacitor that stores the cell voltage of the selected cell; and
   a relay unit that
      connects the capacitor to the cell selecting unit, when the capacitor stores the cell voltage of the selected cell, and
      connects the capacitor to the MCU, when the MCU measures the cell voltage of the selected cell.

9. A battery management method to balance cells of a battery that are connected in series, the method comprising:
   sequentially measuring cell voltages of the cells by repeatedly selecting one of the cells that is not being balanced and measuring a corresponding one of the cell voltages of the selected one of the cells that is not being balanced;
   comparing the measured cell voltages to a reference voltage, to determine if the cells are unbalanced; and
   balancing the unbalanced cells,
   wherein the measuring and the balancing are not simultaneously performed on any two of the cells that are directly adjacent to each other.

10. The battery management method of claim 9, wherein the cells that are directly adjacent to each other are directly electrically connected to each other.

11. The battery management method of claim 10, wherein the balancing of the unbalanced cells occurs after the cell voltages of the cells that are directly adjacent to the unbalanced cells are measured.

12. The battery management method of claim 9, wherein the measuring and the cell balancing occur simultaneously in at least two non-directly adjacent cells from among the cells.

13. A battery management system, comprising:
   cells connected in series, which have cell voltages;
   a cell balancing unit that balances the cell voltages;
   a cell selecting unit that selectively establishes an electrical connection to a selected cell, the selected cell being one of the cells that is not being balanced, via power lines that are shared by pairs of the cells; and
   a micro-control unit (MCU) that measures the cell voltage of the cells, controls operations of the cell balancing unit and the cell selecting unit,
   wherein when the cell selecting unit establishes an electrical connection to the selected cell that is not being balanced, the MCU measures the voltage of the selected cell and prevents the cell balancing unit from balancing the selected cell and the cells that share the power lines through which the electrical connection is established, while the cell voltage of the selected cell is being measured.

14. The battery management system of claim 13, wherein the cell balancing unit balances one of the cells that does not share the power lines of the selected cell, when the cell voltage of the selected cell is being measured.

15. The battery management system of claim 13, wherein the cell selecting unit comprises pairs of switches that are connected to each of the power lines.

16. The battery management system of claim 13, wherein the cell balancing unit comprises resistors and switches that correspond to each of the cells.

17. The battery management system of claim 13, further comprising:
   a capacitor that stores the cell voltage of the selected cell; and a relay unit that
 connects the capacitor to the cell selecting unit, when the capacitor stores the cell voltage of the selected cell, and
connects the capacitor to the MCU, when the MCU measures the cell voltage of the selected cell.

* * * * *